United States Patent [19]

Bourdelle et al.

[11] 4,241,828

[45] Dec. 30, 1980

[54] COMPACT SHEATH PACKAGE FOR MEDICAL INSTRUMENTS

[75] Inventors: Peter A. Bourdelle, Plainsboro; Norman Schiff, Kendall Park, both of N.J.

[73] Assignee: Johnson & Johnson, New Brunswick, N.J.

[21] Appl. No.: 710,044

[22] Filed: Jul. 30, 1976

[51] Int. Cl.³ .............................................. B65D 85/38
[52] U.S. Cl. ..................................... 206/306; 206/69; 206/484; 206/802
[58] Field of Search ................ 206/69, 212, 306, 498, 206/802, 484, 601

[56] References Cited

U.S. PATENT DOCUMENTS

| 3,301,394 | 1/1967 | Baermann et al. | 206/306 |
| 3,469,685 | 9/1969 | Baermann | 206/306 |
| 3,703,892 | 12/1970 | Meyers | 206/69 X |
| 3,833,115 | 9/1974 | Schapker | 206/306 |
| 3,847,280 | 11/1974 | Poncy | 206/306 |
| 4,013,099 | 3/1977 | Gerigk et al. | 206/802 X |

*Primary Examiner*—Herbert F. Ross
*Attorney, Agent, or Firm*—Irving Newman

[57] ABSTRACT

A disposable, easy to handle, compact sheath and sheath package for medical instruments which includes a sheath in a shirred condition packaged within a hollow envelope and affixed thereto, the envelope being sealed to protect the cleanliness of the outside surface of the sheath contained within before use, with an entry end of the envelope capable of being penetrated by a medical instrument for insertion into the sheath and an exit end of the envelope capable of being penetrated by the sheath-covered instrument permitting use of that instrument.

3 Claims, 10 Drawing Figures

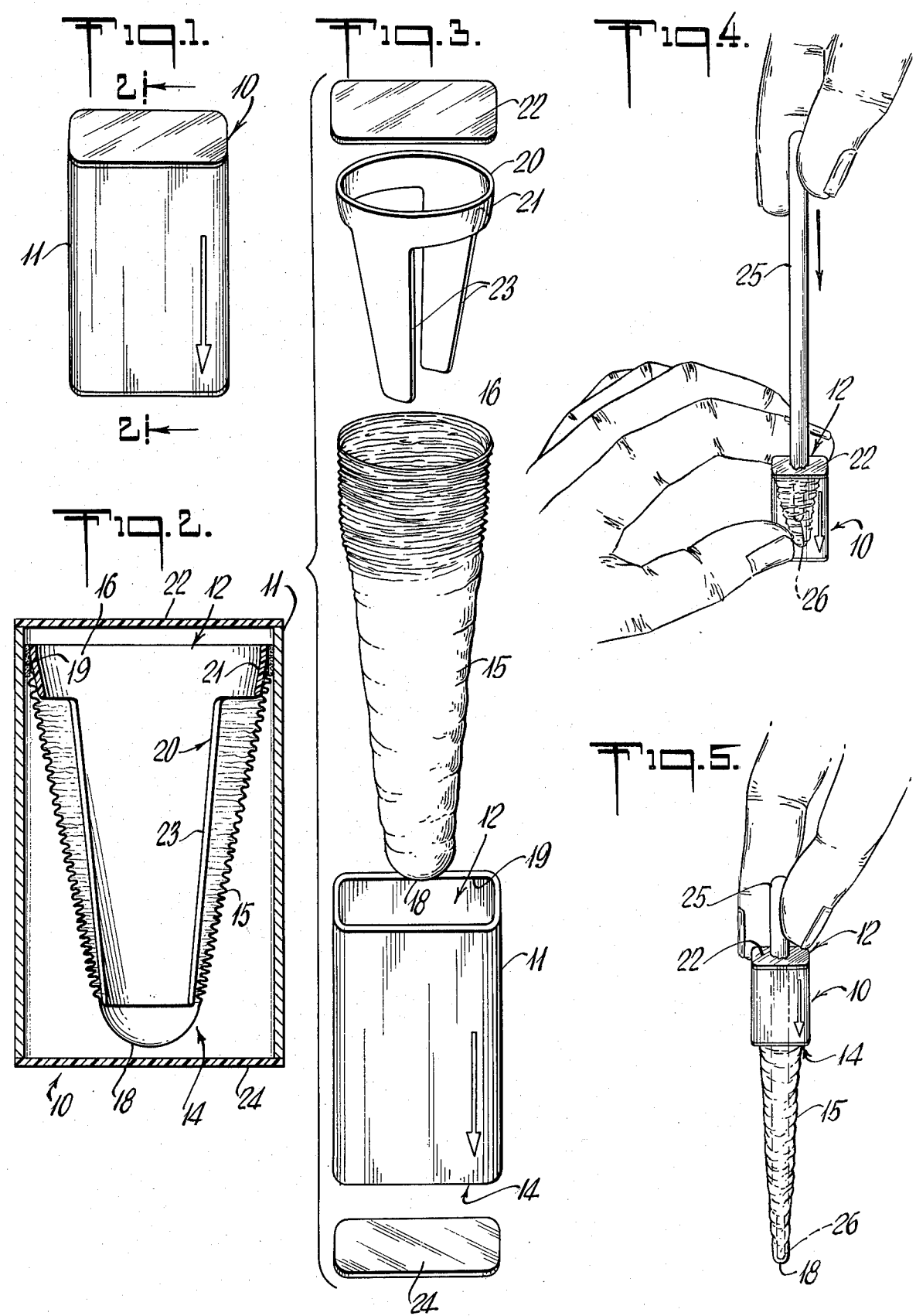

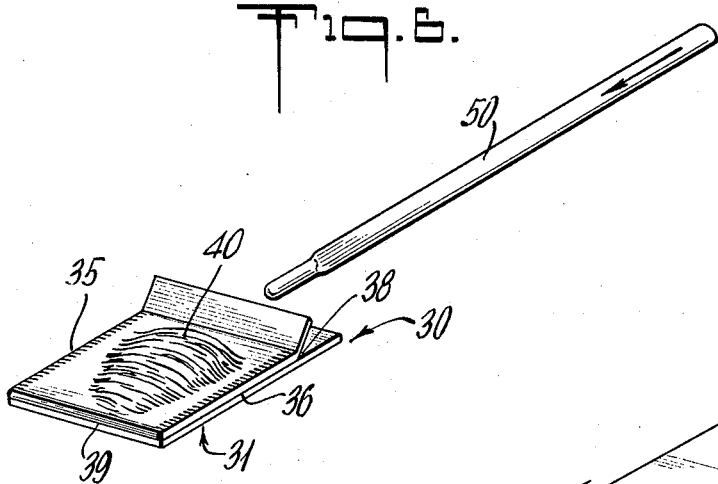
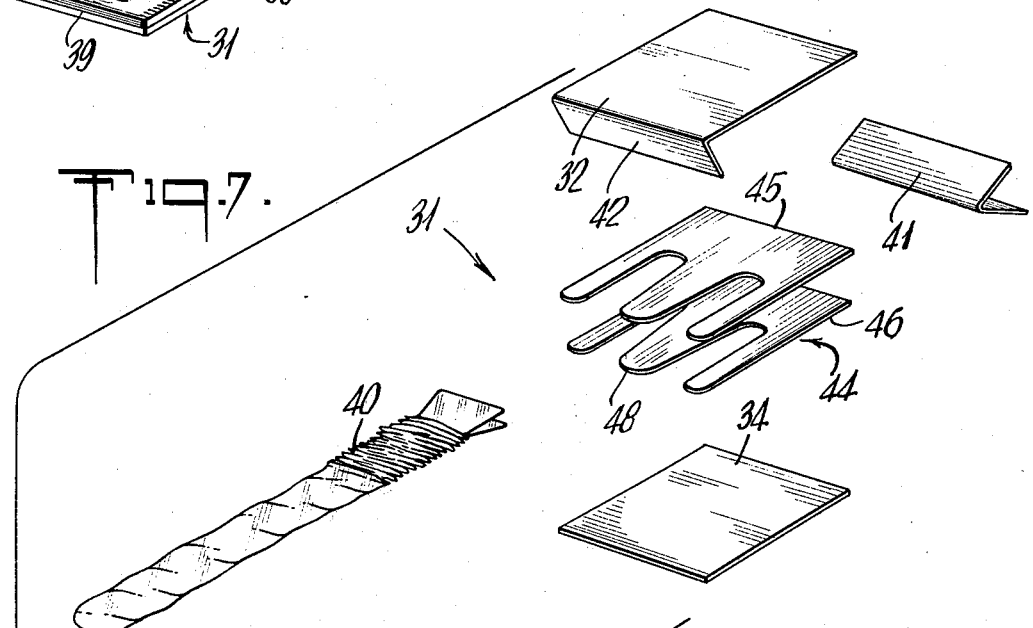
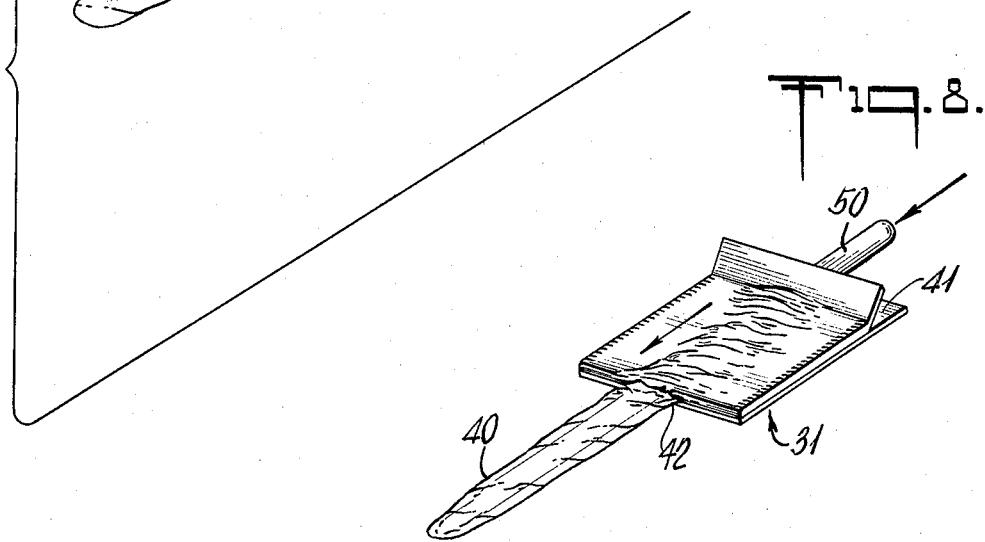

COMPACT SHEATH PACKAGE FOR MEDICAL INSTRUMENTS

BACKGROUND OF THE INVENTION

This invention relates to sheath packages for medical instruments and more particularly relates to a disposable, compact sheath package containing a sheath used to cover clinical thermometers.

A number of instruments are used in the medical profession and, to some extent, the scientific profession to enter the mouth and other body cavities of human beings and animals for the purpose of taking various measurements, probes, observations and the like. Clinical thermometers, tongue depressors, probing instruments and the like are examples of medical and scientific instruments employed for such purposes. Of primary concern in the use of these instruments is the necessity to provide instruments which are clean, and preferably sterile, to prevent bacteria and harmful microorganisms from being communicated from the instrument to the patient. In many instances, for example, with the ordinary clinical thermometer, known techniques to sterilize the instrument itself have not been thoroughly effective in preventing the transmittal of bacteria. As a means to provide cleanliness and/or sterility during use of these instruments, prophylactic covers or sheaths have been devised and are now used and accepted by the medical profession in an effort to prevent bacteria from being communicated by contaminated instruments.

Particularly with clinical thermometer sheaths there are many known types and variations which attempt to provide sterile conditions when the thermometer is being used. In general, to be feasible and accepted on a wide scale, these sheaths must be disposable, practical, and be an economical means of facilitating the use of the thermometer. Since the sheath for a thermometer will have wide scale application in doctor's offices and medical facilities, the package containing the sheath must have features such as simple construction, which minimizes the expense of fabrication while limiting the difficulty of extracting the sheath, convenience to the user and easy handleability both before the sheath is exposed and thereafter during use of the sheathcovered thermometer, and simplicity in use requiring a minimum of in-service training.

A number of known packages containing prophylactic sheaths, such as U.S. Pat. Nos. 3,847,280, 3,552,558, 3,092,252 and Re. 26,447, encompass many of the general features for such a product. However, while these and other sheath packages contain many advantageous features, their principal shortcoming lies in the means to expose the sheath located within the package. Specifically, the known sheath packages require some tearing, stripping, twisting or otherwise of the outer surfaces of the package, generally with the hand or fingers, to expose the sheath inside. The problem is that when tearing, stripping, etc., the hand or fingers may, and often do, touch the outside surface of the sheath thereby contaminating the sheath just prior to patient use. Moreover, since tearing or stripping of the package is involved in many, if not most, of the known sheath packages there are excess scrap pieces which must be disposed of, and this requires that the person opening the sheath package must perform an additional step of discarding the scrap pieces, which could lead to more carelessness in touching the contaminating the now exposed outer surface of the sheath. Also, removal of these extra items adds to the complexity in use, thereby requiring specific training and in-service re-inforcement for use user.

Other sheath packages such as described in U.S. Pat. Nos. 3,469,685 and 3,308,940 are constructed so that an instrument may be inserted into the package without any tearing or stripping involved. However, these type packages are generally fabricated with weakened sections, score lines or recessed areas to facilitate the entrance and exit of the instrument. The weakened sections and score lines provide regions with tenuous barrier potential where bacteria may enter. Furthermore, the manufacturing steps to produce score lines or weakened areas on the package add expense to the fabrication of the package, thus detracting from the economical aspect of the product.

Additionally, many of the packages which contain the prophylactic sheaths are about as long as the thermometer itself, are very thin and thereby flexible. The length of these packages detracts from the compactness of the package, whereas the flexibility often introduces some cumbersomeness and awkwardness in attempting to insert the thermometer into the package and then into the sheath.

SUMMARY OF THE INVENTION

New disposable sheath packages of the present invention not only overcome the deficiencies of the prior art as noted above, but also include other general and specific features desirable in packages which contain a prophylactic sheath for medical and other instruments. To minimize or eliminate the opportunity to contaminate the outside surface of the sheath while exposing or extracting the sheath from the package, packages have been designed to allow thermometer insertion without extraneous peeling, tearing, twisting or the like. Coverge of the thermometer with the sheath is accomplished by merely inserting the thermometer into the package, thereby simplifying the opening technique and keeping use of the hands or fingers, which may be contaminated, to a minimum. Since peeling, tearing, etc., of these new packages are not required, there are no scraps of packaging material to dispose of in order to extract the sheath from inside the package. As can be seen, this not only is a time-saving technique, but further reduces the possibility of careless touching and contamination, while also providing an environmental compensation in that little scraps of material do not have to be discarded. Furthermore, these new sheath packages, with the sheath therein, are very compact, simple and convenient to use, requiring minimal training, and, of course, are disposable after use.

Besides the features and advantages listed above, the new sheath packages of the present invention are simply constructed to allow inexpensive fabrication while eliminating score lines or weakened areas therein; in addition, the selections of materials are compatible with its intended function. Moreover, the new sheath packages are easy to handle during use since the construction of the packages with the thermometer inserted in the sheath inside provides an easy grip for holding during use. The construction of the new packages readily allows at least the outside surface of the sheath contained within to remain uncontaminated while the sheath is being extracted in preparation for use of the covered instrument.

In accordance with the principles of this invention, a sheath package comprises an elongatable prophylactic sheath having an open end for receiving an instrument and a closed end for covering at least a portion of that instrument. Included in the sheath package is an envelope having an entry end and an exit end and having a length in its longitudinal direction less than the length of the sheath when elongated. The sheath is affixed near its open end to the interior surface of the envelope with the open end of the sheath facing the entry end of the envelope. To be completely accommodated within the envelope the sheath is compacted in length so that its compacted length is equal to or slightly less than the length of the envelope. Means to seal the envelope to protect the cleanliness of the outside surface of the sheath is also included in the sheath package. The entry end of the envelope is capable of being penetrated by an instrument for insertion into the open end of the sheath. Additionally, the exit end of the envelope is capable of being penetrated by the sheath-covered instrument for use of that instrument.

In its preferred embodiment the sheath package contains a shirred, or accordion pleated, thermometer sheath inside and affixed to a tubular envelope which is generally oval or circular in cross-section. To guide the thermometer into the open end of the shirred sheath, guide means is located in the open end of the sheath, and is also affixed to the interior surface of the envelope, with the sheath being shirred over the guide. Covering the entry and exit ends of the envelope are frangible members which are sealed to the envelope to protect the cleanliness of the outside surface of the shirred sheath contained within the envelope. In use, the thermometer penetrates the entry membrane, and is guided into the open end of the sheath and through the guide to the closed end. As the thermometer is further inserted, the sheath is effectively pulled forward until it is fully extended. Due to this extension the sheath penetrates and passes through the exit membrane, thus creating a system which consists of a thermometer covered by a barrier which presents an uncontaminated surface to the patient, preventing transmission of harmful microorganisms by the thermometer.

In addition to the preferred tubular version, the sheath package may be fabricated in a flat or planar variation which is very compact, easy to manufacture and presents an efficiently packaged product for the user thereof. This planar sheath package has an envelope which includes two substantially parallel members joined together at the edges while leaving the entry and exit ends unjoined. The compacted sheath is incorporated between the members in the area between the joined edges.

Another embodiment of this invention includes a tubular package in which a seal at the exit end thereof is removed before insertion of the instrument into the package. While this embodiment includes a number of the disadvantages as pointed out above in conjunction with tearing or stripping of packages, it includes significant advantageous features as well.

In those packages wherein the sheath-covered instrument ruptures through the package for use (such as in U.S. Pat. No. 3,469,685 and in the embodiments described above) there is a possibility that the outside surface of the package has been contaminated. By passing through this contaminated area, the surface of the sheath may contact bacteria thereby losing its sterility or cleanliness. One way to avoid this exposure of the sheath to contamination is to remove the covering package or portions of it before instrument insertion.

For instance, U.S. Pat. No. Re 26,477, describes one such package in which the cover is removed previous to insertion. However, with this package and others like it, the sheath is completely exposed, and may be touched by careless hands or with other instruments. Thus, whether removing the cover or leaving it on the sheath package, problems have been encountered which suggest room for improvement.

In the embodiment of this invention to overcome these deficiencies and provide the desired improvements, only the exit seal itself is removed from the package. As the sheath remains compacted within the package until the instrument enters, there is no exposure of the sheath to careless hands or contaminated instruments; however, an open passage is provided for the sheath-covered instrument to pass through for use. This embodiment retains the simple construction of the tubular package as set forth previously, along with the concomitant advantages and features described therewith.

BRIEF DESCRIPTION OF THE DRAWINGS

These and other advantages, features and aspects of the invention will become apparent upon reading the following detailed description and upon reference to the accompanying drawings, in which:

FIG. 1 is a perspective view of one embodiment of the sheath package containing a clean sheath therein;

FIG. 2 is an enlarged sectional view taken along lines 2—2 of FIG. 1;

FIG. 3 is an exploded view of the components of the sheath package of FIG. 1;

FIG. 4 is a perspective view showing entry of an instrument into the sheath package;

FIG. 5 is a perspective view showing an instrument covered with a prophylactic sheath ready for use;

FIG. 6 is a perspective view depicting a planar embodiment of the present invention containing a clean sheath therein;

FIG. 7 is an exploded view of the components of the planar sheath package of FIG. 6;

FIG. 8 is a perspective view showing the planar sheath package and a sheath-covered instrument;

Figure 9:
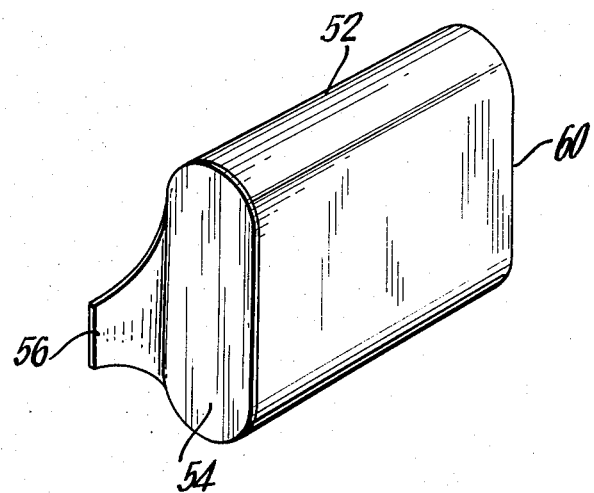
FIG. 9 is a perspective of a sheath package with a removable exit seal.

While the invention will be described in connection with a preferred embodiment, it will be understood that it is not intended to limit the invention to that embodiment. On the contrary, it is intended to cover all alternatives, modifications and equivalents as may be included within the spirit and scope of the described invention.

DETAILED DESCRIPTION OF THE INVENTION

Adverting to FIGS. 1–5 of the drawings in which a preferred embodiment is illustrated, there is shown a sheath package 10. In FIG. 1 the sheath package 10 is pictured in its compact ready-to-use condition, with the sheath enclosed within. The contents of the sheath package are more clearly depicted in FIGS. 2 and 3. Forming the outside of the sheath package is an envelope 11 which preferably has an oval shaped, hollow, tubular cross-section. However, depending upon choice, manufacturing conditions and other factors the tubular cross-sectional shape of the envelope may be circular, elliptical, rectangular, square, triangular or other desirable shapes. The performance of the sheath package of the present invention does not depend on the cross-sectional shape of the envelope. For best results and ease of use, the smallest cross-sectional dimension of the interior surface 19 of the envelope 11 is greater than the cross-sectional dimension of the instrument, such as a thermometer, which is inserted into the sheath 15 therein. In this way there is no constriction on the instrument being inserted, and no need to "open up" the sheath since the sheath does not have to be flattened out within the envelope. Typically, the smallest cross-sectional dimension of the interior surface 19 of the envelope 11 for clinical thermometer purposes is at least 0.25 inches (0.63 cm.).

One end of the envelope 11 is an entry end 12 for an instrument such as a thermometer, while the opposite end of the envelope is an instrument exit end 14. Inside the envelope 11 is an elongatable sheath 15 which has an outside surface which has been sterilized after packaging within the envelope. Such sterilizing techniques include irradiation of the closed package, gas application directly or indirectly through the envelope, aseptic condition producing powders or liquids which are not injurious to humans, and the like. Since it is desirable to prevent transmission of any injurious or contamination disease caused by pathological bacteria or virus on the instrument or the sheath the sterilization techniques are employed. It must be kept in mind, however, that these sterilization techniques are merely the most practical and economical steps to provide a thermometer sheath with a bacteria or contaminant free surface as is possible for clinical applications.

Sheath 15 includes an open end 16 for receiving an instrument such as a thermometer, and a closed end 18 for covering at least a portion of the thermometer after it has been inserted into the sheath 15. Since the sheath covers a portion of the thermometer sufficient to enter a body cavity for measuring temperature, the elongated length of the sheath is approximately the length of the thermometer or somewhat shorter. For standard clinical thermometers this length is about 3 to 4 inches (7.62 to 10.16 cm.). However, depending upon the instrument being used, the elongated length of the sheath may vary according to the instrument being used.

In order to provide a compact sheath package in which it is not necessary to maintain the sheath in its elongated condition, the sheath 15 is compacted in length so that the compacted length is only a fraction of the elongated length of the sheath. The nature of the sheath material, which will hereinafter be discussed, permits such a compacting. In its preferred embodiment the compacted sheath is shirred, or accordion pleated, so that the sheath material is drawn together or gathered along its length. For best results of the shirred sheath it is often desirable to employ a sheath which is tapered along its length, with the widest part of the taper being at the open end 16 of the sheath 15. This tapering allows the gathered folds of the shirred sheath to build up on each other, in a pyramid structure, as seen clearly in FIG. 1. It is the shirred sheath which is packaged in this invention.

Since the shirred sheath 15 has a length only a fraction of the elongated length of the sheath, it is necessary that the envelope 11 have a length in its longitudinal direction somewhat in excess of the length of the shirred sheath, but less than the length of the sheath when elongated. The shirred sheath 15 is affixed near its open end 16 to the interior surface 19 of the envelope so that the open end 16 of the sheath 15 faces the entry end 12 of the envelope 11. Sheath 15 may be affixed to the envelope by various techniques including adhesive bonding, ultra-sonic bonding, radio frequency bonding, heat-sealing or fusing when the materials are compatible, or any other feasible means to accomplish the affixation.

In order to improve the reliability of the thermometer entering the sheath in a straight and proper manner, an insert guide 20 may be included in those embodiments, where desirable. To provide its guiding function, insert 20 is positioned inside the shirred sheath 15 just within its open end 16. So that the guide 20 will conduct the thermometer properly into the sheath, the guide 20 is preferably tapered, with the larger portion near the open end of sheath 15. Various tapers may be employed such as the "T" shape depicted in FIG. 3. The "T" portion fits fairly close to the sides of the oval shaped envelope 11, and may even be flattened to present a sandwich effect. This "T" section 21 is secured to the inside of the envelope. Stem portion 23, in this instance, two tongue-like elements in opposing relationship, protrude, into the shirred sheath, and due to its reducing cross-dimension allows the sheath to be gathered up along its length as seen in FIG. 2. When the instrument is inserted into the package the shirred sheath 15 readily and smoothly unfolds along the length of the tapered stem 23 until it is completely extended. Other tapered guides may also be used, and they may be of a one-piece construction, with or without seam, two or more pieces secured together into the desired configuration, or even folded origami-style into a flattened funnel with an overlapping seam. As can be seen, the purpose of the guide is to assist in directing the thermometer to the closed end 18 of the sheath while preventing the thermometer from skewing to the sides during insertion, and to retain the shirred sheath in an orderly fashion. To accomplish this it is not necessary that the guide completely surround the thermometer; partial surrounding in a proper configuration is often adequate to effect the guiding of the thermometer.

In its most desirable form, the guide 20 is semi-rigid in structure so as not to collapse about the thermometer as it passes through. As is the shirred sheath 15, the insert 20 remains attached to the interior surface 19 of the envelope 11 after the thermometer passes through and becomes covered by the sheath 15. A portion of insert 20 is attached to the interior surface of the envelope by any of the means as described above in conjunction with the affixation of the shirred sheath. It is preferable to affix the sheath 15 and the insert guide 20 to the envelope in the same operation and at the same location on the interior surface 19 so that only one fabrication step is necessary. Most desirably, when the materials are compatible, the sheath 15 and insert guide 20 are ultrasonically sealed to the interior surface 19 of the envelope.

Covering the entry end 12 and the exit end 14 of the envelope 11 are frangible membranes 22 and 24. These membranes 22 and 24 are sealed to the envelope 11 in their respective positions so that the outside surface of the shirred sheath 15 contained within the envelope will have, at least, its cleanliness protected. The membranes 22 and 24 are sealed to the envelope by various techniques including adhesive bonding, heat sealing, and the like. It is critical that the envelope seals not only seal the envelope to protect the outside surface of the sheath, but that they allow the thermometer to penetrate the entry end 12 to be inserted into the open end 16 of the sheath 15, and thereafter to allow the covered thermometer to penetrate the exit end 14 so that the covered thermometer may be used. This operation is clearly depicted in FIGS. 4 and 5.

Thermometer 25 is inserted into the package 10 by pressing against and rupturing frangible membrane 22 covering entry end 12. Once through the ruptured membrane 22 thermometer 25 enters the open end 16 of the shirred sheath contained within the package. As thermometer 25 is being pushed into the package by the user thereof the insert guide 20 allows the thermometer tip 26 to bottom against the closed end 18 of the sheath 15. Continued pushing by the user of thermometer 25 begins to extend the shirred sheath 15, whereby the covered thermometer tip 26 ruptures and penetrates frangible membrane 24 on the exit end 14 of the package. Further pushing of the thermometer 25 extends the shirred sheath 15 to its elongated length, sufficiently long to cover a portion of the thermometer, the sheath 15, however, remaining attached to the interior surface of the envelope near its open end 16. In the condition shown in FIG. 5, the covered thermometer 25 is now ready for use, the user holding the non-covered end of the thermometer near the envelope portion of the package, such being an easy handle with which to hold the thermometer for insertion.

Although the preferred embodiment as shown in the drawings includes frangible membranes on both ends of the cylinder to protect the outside surface of the sheath, other means to seal the envelope may be employed as long as they are compatible with thermometer penetration of both ends. For instance, since only the outside surface of the sheath need be protected, the membrane on the entry end 12 may be omitted with proper sealing of the sheath 15. In other words, if the sheath 15 is sealed around its open end 16 to the interior surface 19 of the envelope 11 when it is affixed thereto, the outside surface of the sheath 15 will be adequately protected. In this embodiment, the thermometer immediately penetrates the entry end 12 of the envelope 11 without having to rupture any membrane; the exit end 14 remains sealed with a frangible membrane.

Figure 10:
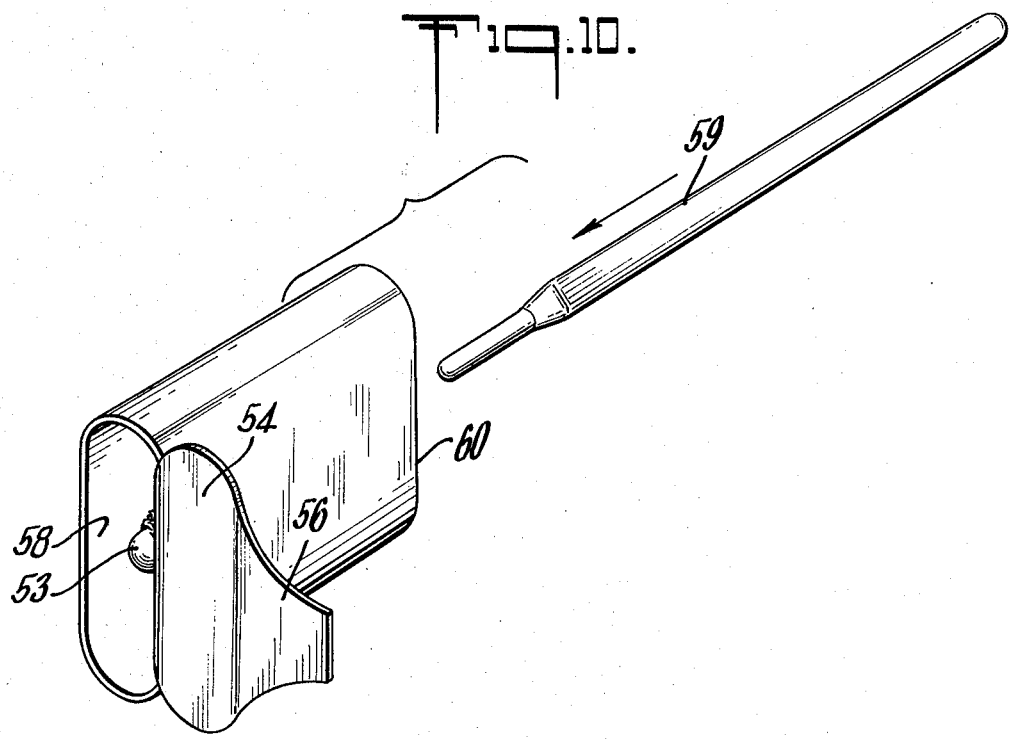
FIG. 10 shows the package of FIG. 9 with the exit seal partially removed.

A variation of the foregoing tubular envelope package is illustrated in FIGS. 9 and 10. In this embodiment the oval-shaped, tubular envelope 52 contains a compacted prohpylactic sheath 53 within as described with the foregoing embodiment. Preferably, this variation also includes guide means (not shown) for facilitation of the instrument into the open end of the sheath 53 inside the package. This guide means, its function and construction have been set forth in the previous description. Instead of allowing the sheath-covered thermometer to rupture the exit seal, this embodiment includes an exit seal 54 which is removably sealed to the envelope 52. Exit seal 54 is generally made of flexible material and includes a pull tab 56 extending from the package to facilitate removability. The exit seal 54 may be glued, heat sealed or attached in other ways which seals the package to protect the sterility or cleanliness of at least the outside surface of the sheath within the envelope before use. Many convenient materials such as paper, metal foil, plastic films, combinations of the foregoing and the like may be employed to provide the removable exit seal 54.

This embodiment includes the different means for sealing the entry end of the envelope as in the preferred embodiment, including sealing a frangible membrane over the entry end, sealing the open end of the sheath all around the interior surface of the envelope, and the like.

When this package is ready to be used, pull tab 56 is grasped and removable exit seal 54 is peeled away from the exit end 58 of the envelope 52. Exit seal 54 may be completely removed and discarded, or may be partially removed so that it remains hingedly attached to the exit end 58 of the envelope 52 during use. By leaving exit seal 54 attached it is possible to extend the sheath out through the end with no obstacles; furthermore, it is acceptable should the sheath touch the inside surface of exit seal 54, since that surface will be in a clean or sterile condition.

Once the exit end 58 has been opened, it can be seen that sheath 53 remains covered and protected by the envelope 52 inside which the sheath remains compacted. The compacted sheath material has sufficient inherent stability, especially when in a shirred condition, to remain compacted until the force of the instrument extends the sheath to its elongated length. Thus, inadvertent movements of the opened package generally do not cause the compacted sheath to drop out of the envelope. To extend the sheath 53, a thermometer 59 or other instrument penetrates the entry end 60 of the envelope 52 to engage the inside surface of the sheath. Further insertion of thermometer 59 starts to elongate the sheath so that the sheath covered thermometer extends through the previously opened exit end 58 of the envelope. As the sheath covered instrument has no membrane to rupture upon its being extended, a possible source of contamination has been eliminated, thus assuring a sterile or clean surface for use on a patient.

Besides the tubular envelope version of the sheath package as described above, a desirable alternative is a planar or more flat version as shown in FIGS. 6-8. Referring specifically to FIGS. 6 and 7 there is shown a planar sheath package 30 which has an envelope 31 comprised of two substantially parallel members 32 and 34. These parallel members, such as two pieces of stiff cardboard of about identical size, are joined together at side edges 35 and 36 thereof. Glue, adhesives, stitching and the like may be used for this sealing. Instrument entry end 38 and exit end 39 are not joined as are the side edges. In this way a rhombus shaped volume is created between the parallel members when the side edges of the package are pressed in towards the center.

In the area between the joined edges 35 and 36 lies the compacted, preferably shirred, prophylactic sheath 40. This sheath 40 has the same or similar features and characteristics as described in the preferred embodiment, and is positioned between the members so that its open end faces the entry end 38 of the envelope 31. For overall compactness and to take advantage of the shirred sheath 40, envelope 31 has a length in its longitudinal direction less than the length of the sheath 40 when elongated. This feature is clearly seen in FIG. 7 wherein sheath 40 is shown partially shirred and partially elongated. In the packaged form, sheath 40 is compacted in length so as to be completely accommodated within the envelope 31.

To seal this planar package sealing means similar to that used on the tubular package may be employed. For instance, frangible membranes such as strips of paper are entrapped between the side seals and bonded to the entry and exit ends of the envelope 31. Entry seal 41 is a strip of folded paper to provide a better target for instrument insertion, as seen in FIG. 6, whereas exit seal 42 is merely a strip of paper protruding in folded fashion from one of the parallel members. Of course, other desirable means of sealing this package are also practical and feasible, keeping in mind that the seals are to be penetrable by insertion of an instrument therethrough, without the necessity of manual or other tearing operations.

As a means to assist in directing the instrument into the sheath, guide means 44 is preferable included in this embodiment. While selection of suitable guide means is not critical, an "M" shaped, flat guide means is most compatible with the functionability and fabrication of the planar package. The "M" shaped guide includes two side legs and a tapered tongue 48 at the center of the "M". Two flat "M" shaped guides 46 and 47 are superimposed upon each other and are sealed together at and along the side legs, thereby leaving an opening accessible between the two center tongues 48. When packaged, the tapered tongues 48 are inserted into the sheath whereupon the sheath is shirred thereover. The two parallel members and the legs of the "M" shaped guide are joined together in one convenient sealing operation. Shirred sheath 40 is sandwiched between the parallel members 32 and 34 while a portion of the guide 44 is affixed to the interior surfaces thereof.

Use of the planar sheath package is similar to the tubular package. As seen in FIG. 8, thermometer 50 is inserted into the entry end 41 of the package 31, into the space between the tongue elements of the guides and thereby into the shirred sheath 40. Once the thermometer 50 is seated in the sheath 40 further pushing extends the sheath until the seal at the exit end 42 is ruptured thereby exposing the sheath-covered thermometer for use.

A variety of materials may be selected to form the envelope in the sheath packages of the present invention. Inexpensive materials such as paper, cardboard, coated paper or cardboard and plastic may be selected, with plastic material being the most desirable. Not only is the plastic somewhat rigid in construction, but also lends itself to heat or other sealing operations to affix the sheath and insert guide to the inside surface thereof. While not necessary it is also preferable that the tubular envelope be seamless in order to minimize the fabrication operations and eliminate overlapping sections which may allow a contamination path to the clean item inside. Depending upon the instrument to be sheath-covered, the size of the envelope will vary accordingly, however, for a standard clinical thermometer an oval envelope having a length of ⅞ inch (2.22 cm.), major diameter (or length) of ½ inch (1.27 cm.), minor diameter (or width) of ¼ inch (0.635 cm.) and wall thickness of about 1/32 inch (0.079 cm.) may be used. Accordingly, in the planar package two similar parallel members typically 1 inch (2.54 cm.) wide by 1⅛ inch inch (2.858 cm.) and made of 0.018 inch (0.046 cm.) solid bleached sulfate (18 point SBS) or other paperboards and the like can accommodate a shirred thermometer sheath.

Insert guide material may be similar to that of the envelope, and is desirably sealably compatible thereto. Once again, plastic is the preferable material for this guide, either used alone or as a coating on the guide, for two reasons: the first is that the plastic material may be suitably sealed, with the sheath, to the envelope; the second is that plastic is somewhat rigid and retains its form inside the shirred sheath when the instrument is inserted. The length of the guide is generally the same as the length of the envelope, or somewhat shorter. For instance, the guide depicted in FIG. 3 is approximately ⅞ inch (2.22 cm.) in length and measures ½ inch (1.27 cm.) when flattened—across the "T" portion. The two tongues of the stem taper to about ¼ inch (0.635 cm.) at their tips. Wall thickness is about 0.010 inch (0.0254 cm.). Comparable dimensions are measured on the "M" shaped guide of the planar package.

Choice of sheath material must not only be compatible with the ability to remain clean when packaged, but must be selected so that it fits properly around the instrument and, especially with a thermometer, has excellent thermal conductivity properties. While a number of materials may be selected it has been found that film approximately 0.001 inch (0.00254 cm.) thick ethylene vinyl acetate copolymer (EVA) may be desirably used. This film, or other films, may be sealed from two layers of material or sealed otherwise, or may be fabricated so that the sheath is seamless. As mentioned above, for facilitation of the shirring operation a tapered sheath is most desirable with the widest part of the taper being the open end of the sheath. This not only provides good results for the shirred sheath, but also enlarges the open end of the sheath for entry of the thermometer. On the other hand, if a tapered sheath is not employed, variations may be used which, for instance, include a flared end at the open end of the sheath to facilitate insertion of the thermometer into the sheath.

The frangible membranes covering the entry and exit ends of the envelope are suitably made from inexpensive materials which will allow sealing to the envelope to insure the protection of the sheath contained within. Besides the protective seal, these membranes also have a low tear strength to allow them to rupture easily when a thermometer or other instrument is pushed against them. Along these lines, paper disks, paper coated with low tear strength plastic, metal foil, low tear strength plastic and the like, generally of the magnitude of a few mils thick, may suitably be used as entry and exit seals.

When the sheath package is fabricated according to the preferred and other embodiments in which both entry and exit ends are sealed with a frangible membrane the user must be notified as to which end contains the open end of the sheath. Accordingly, various techniques are available to indicate the direction of the thermometer or instrument insertion, such as an arrow printed on the package, a circle, dot or mark printed on the entry seal, a textured end, the feel of which indicates insertion end, and other like techniques.

Another embodiment of this invention includes a lubricant, packages within the envelope, so that when the sheath is extracted the lubricant will coat the outside surface thereof. By having a pre-lubricated sheath-covered thermometer used, for example, for rectal measurements, the extra step of applying lubrication is eliminated by the user. The lubricant is generally applied before packaging to the outside surface of the sheath or is contained within the envelope so that it will be applied to the sheath when the thermometer is pushed through the package. When lubricant is pre-packaged in the envelope sealing of the open end of the sheath all around the interior surface thereof will prevent lubricant from migrating to the inside of the sheath.

Thus, it is apparent that there has been provided in accordance with the invention, a compact disposable sheath package containing a prophylactic sheath that fully satisfies the aims, advantages and aspects set forth above. While the invention has been described in conjunction with the specific embodiments thereof, it is evident that many alternatives, modifications and variations will be apparent to those skilled in the art in view of the foregoing description. Accordingly, the plenary invention is intended to embrace all such alternatives, modifications, and variations as fall within the broadest spirit and scope of the described invention.

What is claimed is:

1. A sheath package comprising: an elongatable prophylactic sheath having an open end for receiving an instrument and a closed end for covering at least a portion of said instrument; an envelope including two substantially parallel members joined together at the edges thereof, said envelope having an entry end and an exit end having a length in the longitudinal direction less than the length of said sheath when elongated, said sheath being affixed to the interior surface of said envelope with said open end facing said entry end, said sheath being compacted in length to be completely accommodated within said envelope; means to seal said envelope to protect the cleanliness of the outside surface of said sheath therewithin before use, said entry end of said envelope being capable of being penetrated by an instrument for insertion into said open end of said sheath, and said exit end of said envelope being capable of being penetrated by the sheath-covered instrument; and guide means located in said open end of said sheath for assisting in directing said instrument into said sheath, said guide means including a tapered tongue element which is inserted in said open end of said sheath, a portion of said guide means being affixed to the interior surface of at least one of said parallel envelope members.

2. A sheath package comprising: an elongatable prophylactic sheath having an open end for receiving an instrument and a closed end for covering at least a portion of said instrument; an envelope including two substantially parallel members joined together at the edges thereof, said envelope having an entry end and an exit end and having a length in the longitudinal direction less than the length of said sheath when elongated, said sheath being affixed to the interior surface of said envelope with said open end facing said entry end, said sheath being compacted in length to be completely accommodated within said envelope; means to seal said envelope to protect the cleanliness of the outside surface of said sheath therewithin before use, said entry end of said envelope being capable of being penetrated by an instrument for insertion into said open end of said sheath, and said exit end of said envelope being capable of being penetrated by the sheath-covered instrument; and guide means located in said open end of said sheath for assisting in directing an instrument into said sheath, said guide means comprising two "M" shaped members superimposed upon each other and sealed together at the side edges thereof, each of said "M" shaped members including a tongue element for insertion into the open end of said sheath, said instrument being capable of passing between said tongue elements for entrance into said sheath.

3. A sheath package comprising: an elongatable prophylactic sheath having an open end for receiving an instrument and a closed end for covering at least a portion of said instrument; an envelope including two substantially parallel members joined together at the edges thereof, said envelope having an entry end and an exit end and having a length in the longitudinal direction less than the length of said sheath when elongated, said sheath being affixed to the interior surface of said envelope with said open end facing said entry end, said sheath being compacted in length to be completely accommodated within said envelope; means to seal said envelope to protect the cleanliness of the outside surface of said sheath therewithin before use, said entry end of said envelope being capable of being penetrated by an instrument for insertion into said open end of said sheath, and said exit end of said envelope being capable of being penetrated by the sheath-covered instrument; and guide means located in said open end of said sheath for assisting in directing said instrument into said sheath, a portion of said guide means being affixed to the interior surface of said envelope, said sheath is shirred over and retained by said guide means.

* * * * *